(12) United States Patent
Hemmelgarn et al.

(10) Patent No.: US 6,290,455 B1
(45) Date of Patent: Sep. 18, 2001

(54) CONTOURED HARDWALL CONTAINMENT

(75) Inventors: Robert J. Hemmelgarn, Mason; Sugato Bhattacharjee, Cincinnati; Laura A. Iyer, Cincinnati; Robert P. Czachor, Cincinnati, all of OH (US); Michael L. Barron, Ten Mile, TN (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/454,706

(22) Filed: Dec. 3, 1999

(51) Int. Cl.⁷ ..................................................... F01D 21/00
(52) U.S. Cl. ..................... 415/9; 415/173.4; 415/174.4
(58) Field of Search ............................ 415/9, 119, 173.4, 415/174.4, 200

(56) References Cited

U.S. PATENT DOCUMENTS

| | | | |
|---|---|---|---|
| 4,411,589 | * 10/1983 | Joubert et al. | 415/9 |
| 4,417,848 | 11/1983 | Dembeck | 415/121 G |
| 4,452,565 | * 6/1984 | Monhardt et al. | 415/9 |
| 4,648,795 | * 3/1987 | Lardellier | 415/196 |
| 4,728,255 | 3/1988 | Kirkpatrick et al. | 415/119 |
| 5,413,456 | 5/1995 | Kulak et al. | 415/9 |
| 5,431,532 | * 7/1995 | Humke et al. | 415/9 |
| 5,482,429 | 1/1996 | Penda | 415/9 |
| 5,485,723 | 1/1996 | McCoy et al. | 60/226.1 |
| 5,486,086 | 1/1996 | Bellia et al. | 415/9 |
| 5,823,739 | 10/1998 | Van Duyn | 415/9 |

FOREIGN PATENT DOCUMENTS

0965731-A2 * 12/1999 (EP) .................. F01D/21/04

* cited by examiner

*Primary Examiner*—Edward K. Look
*Assistant Examiner*—Ninh Nguyen
(74) *Attorney, Agent, or Firm*—Andrew C. Hess; Nathan D. Herkamp

(57) ABSTRACT

An improved containment structure for use with turbomachinery, such as turbofan engines. A casing is provided with at least one impact resistant section of a thickness sufficient to resist being pierced upon impact by a blade. The impact resistant section has a smoothly contoured thickness along its axial length and is free from features likely to cause a local failure in the event of impact by a blade released from a rotating disk.

27 Claims, 3 Drawing Sheets

CONTOURED HARDWALL CONTAINMENT

FIELD OF THE INVENTION

The present invention relates to a blade containment structure for a gas turbine engine, and more particularly, to a blade containment system having a contoured casing resistant to local failures in the event of impact by a blade released from a rotating disk.

BACKGROUND

Conventional high bypass ratio turbofan engines, which are included in the more general category of gas turbine engines and which may be used for aircraft propulsion, typically include a fan, booster, high pressure compressor, combustor, high pressure turbine, and low pressure turbine in serial axial flow relationship about a longitudinal centerline axis of the engine. The high pressure turbine is drivingly connected to the high pressure compressor via a first rotor shaft, and the low pressure turbine is drivingly connected to both the fan and booster via a second rotor shaft. The fan includes an annular disk and a plurality of radially extending blades mounted on the disk, wherein the disk and the blades are rotatable about the longitudinal centerline of the engine. Such fans are circumferentially enclosed by a containment casing which is specifically designed to be capable of containing a fan blade in the event that the fan blade is released from its disk during operation. In order to prevent or minimize the structural damage to the engine and aircraft should one or more fan blades be released from the disk due to a catastrophic failure of one or more blades, ingestion of debris, or other cause.

To reduce weight, prior art casings have attempted to minimize material thickness while meeting strength requirements. Therefore, reinforcing structures referred to as containment rings, comprising circumferential rings of increased thickness extending radially outward from the casing, have been used to provide the necessary strength in primary impact areas of the casing. The presence of these containment rings makes the casing sensitive to impact location. During a blade impact, the presence of the containment rings can cause localized areas of high strain leading to failures, and can also promote shear failures if a blade should impact the casing adjacent to the "hard spot" caused by the presence of a containment ring.

A example of a prior art containment system is disclosed in U.S. Pat. No. 4,417,848, issued to Dembeck et al. This patent discloses a containment system in which a fan casing shell 60 has a maximum thickness $T_{max}$ disposed in an axial location where the predicted likelihood of blade impact is greatest. The casing thickness is then tapered away from the maximum thickness section in order to save weight, either in continuous fashion or in discrete steps. Although this type of containment system does have a lower weight compared to a casing having a constant thickness, the Dembeck patent does not address the possibility of optimizing the use of material throughout the containment section.

Accordingly, it would be advantageous to provide an improved containment casing for turbomachinery, such as turbofan engines used in aerospace applications, wherein an impact resistant section is provided for the containment structure so as to enhance the ability of the containment structure to withstand an impact by a released fan blade and at the same time the containment structure should be relatively insensitive to the axial location of the impact of a blade released from a rotating disk while optimizing the thickness contour of material used for containment purposes.

SUMMARY OF THE INVENTION

In accordance with the present invention a blade containment structure is disclosed which includes an annular casing positioned radially outward of the blades and in a surrounding relationship therewith. The casing has an impact resistant section which is formed of a material having a sufficient thickness to resist being pierced upon impact by a released blade. The thickness of the impact resistant section is smoothly contoured to optimize material usage and allow for localized strengthening in known primary impact areas without creating local high strain concentrations or shear failures due to abrupt material thickness transitions.

DETAILED DESCRIPTION OF THE INVENTION

Figure 1:
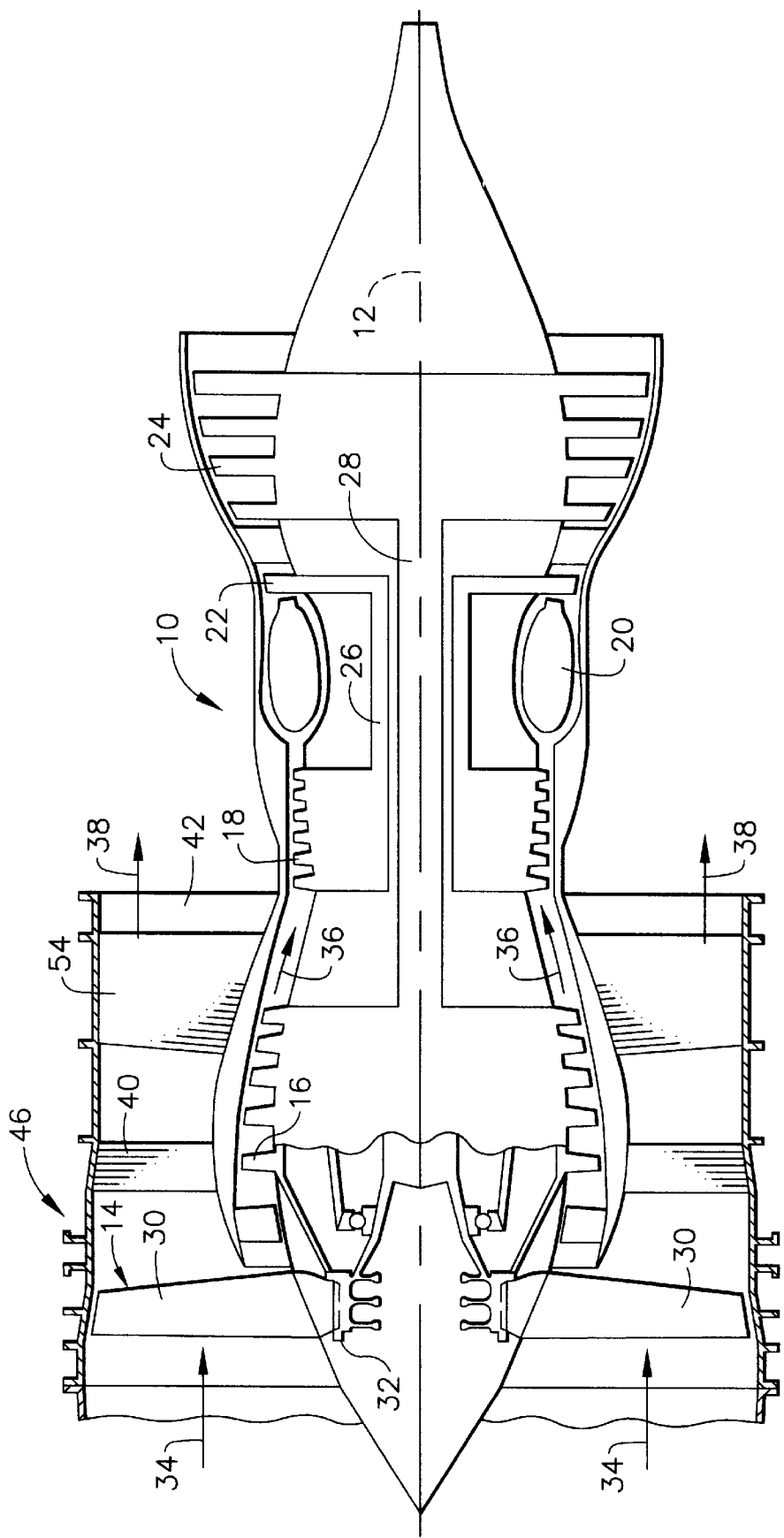
FIG. 1 is a schematic, longitudinal cross-sectional view illustrating an exemplary high bypass ratio turbofan engine incorporating the blade containment system of the present invention.

Referring now to the drawings in detail, wherein identical numerals indicate the same elements throughout the figures, FIG. 1 illustrates a longitudinal cross-sectional view of an exemplary high bypass ratio turbofan engine 10. The engine 10 includes, in serial axial flow communication about a longitudinal centerline axis 12, conventional structures including a fan rotor 14, booster 16, high pressure compressor 18, combustor 20, high pressure turbine 22, and low pressure turbine 24. High pressure turbine 22 is drivingly connected to high pressure compressor 18 with a first rotor shaft 26 and low pressure turbine 24 is drivingly connected to both the booster 16 and fan rotor 14 with a second rotor shaft 28. Fan rotor 14 comprises a plurality of radially extending blades 30 mounted on an annular disk 32, wherein disk 32 and blades 30 are rotatable about the longitudinal centerline axis 12 of engine 10.

During operation of engine 10, ambient air 34 enters the engine inlet and a first portion, denoted the primary gas stream 36, passes through fan rotor 14, booster 16 and high pressure compressor 18, being pressurized by each component in succession. Primary gas stream 36 then enters combustor 20 where the pressurized air is mixed with fuel to provide a high energy gas stream. The high energy gas stream then enters in succession high pressure turbine 22 where it is expanded, with energy extracted to drive high pressure compressor 18, and low pressure turbine 24 where it is further expanded, with energy being extracted to drive fan rotor 14 and booster 16. A second portion of ambient air 34, denoted the secondary or bypass airflow 38, passes through fan rotor 14 and fan outlet guide vanes 40 before exiting the engine through annular duct 42, wherein secondary airflow 38 provides a significant portion of the engine thrust.

Figure 2:
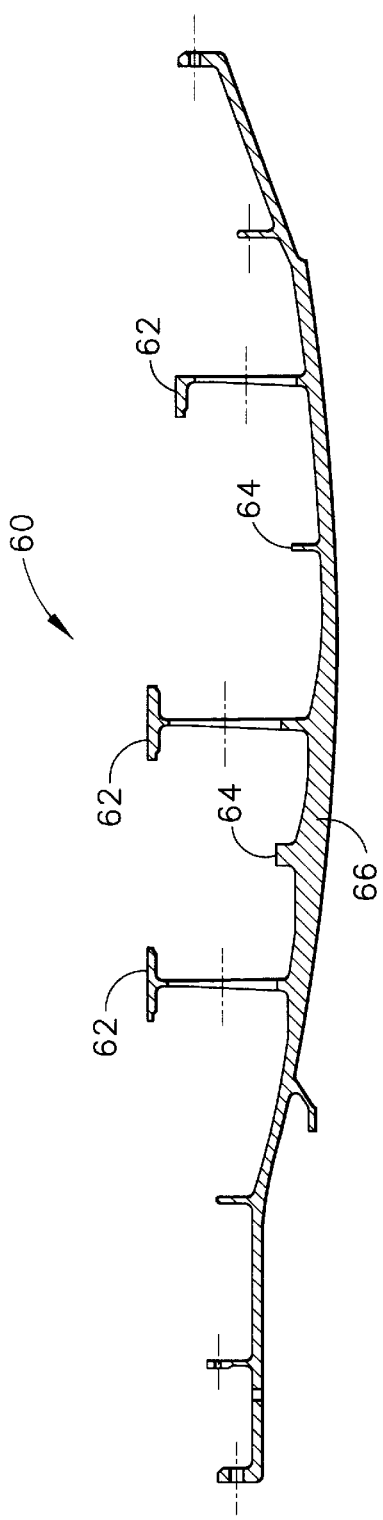
FIG. 2 is a schematic, enlarged fragmentary longitudinal cross-sectional view illustrating a prior art blade containment system commonly known as a hardwall containment system.

FIG. 2 depicts a prior art containment system known as a hardwall containment system. Here the containment system, generally denoted 60, is formed by a metallic casing shell 66 which has a material thickness sufficient to resist piercing upon impact of a blade. The casing shell is typically made from a material such as steel or aluminum. To minimize weight the casing shell 66 is machined to a small thickness. Areas which are likely to experience a direct impact in the event of a blade release (referred to as primary impact areas) of the shell 66 are reinforced with integrally formed circumferential containment rings 64. To meet vibration requirements, the casing 66 is provided with circumferential stiffening rings 62. In some instances the casing is provided with rings that perform the function of both containment rings 64 and stiffening rings 62. The presence of the containment rings 64 introduces abrupt changes in the thickness of the casing shell 66. When the casing deflects during a blade impact this can create localized areas of high strain, which tends to cause failures of the casing shell 66. Furthermore, the abrupt change in material thickness at the fore and aft edges of the containment rings 64 can promote a failure of the case in shear if a released blade happens to impact the case adjacent to the containment ring 64.

Figure 3:
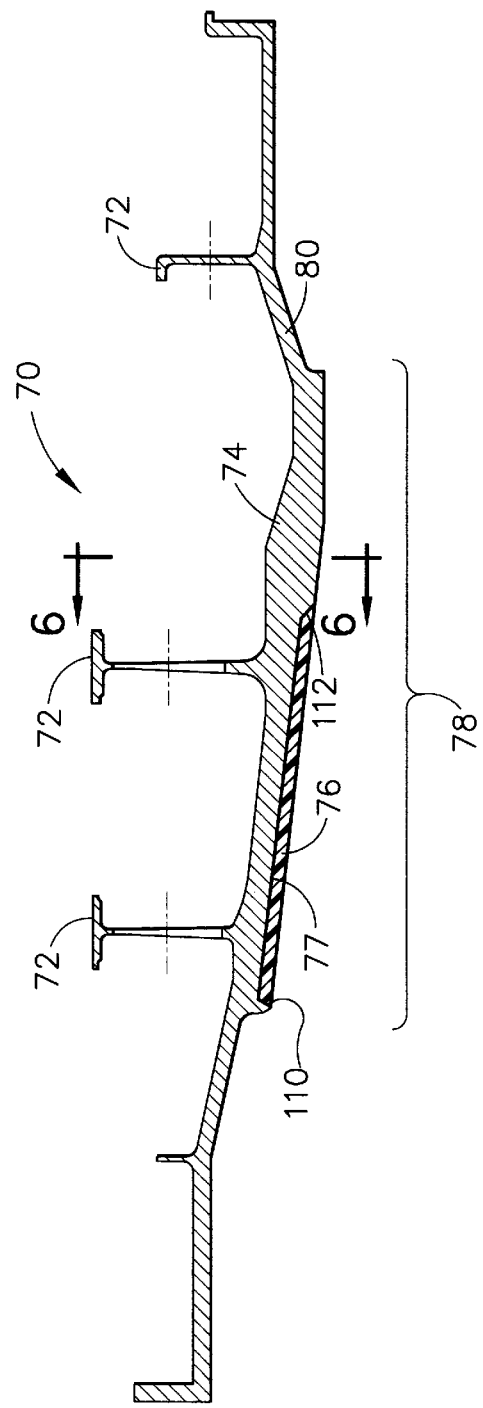
FIG. 3 is a schematic, enlarged fragmentary longitudinal cross-sectional view illustrating a first embodiment of the present invention.

FIG. 3 shows the present invention. A blade containment system 70 includes an annular casing 80 positioned radially outward of the blades (not shown) and in a surrounding relationship therewith. The casing has an impact resistant section 78 which is formed of a material having a sufficient thickness to resist being pierced upon impact by a released blade. The length of said impact resistant section parallel to the engine centerline axis 12 varies but typically the impact resistant section extends from a position approximately opposite the leading edge of the blade to a position spaced aft of the blade leading edge a distance approximately one and one half times the chord length of the blade at the blade tip. A pocket 77 is formed on the radially inner surface of the casing 80 for receiving an abradable shroud 76. The fore and aft edges of the pocket 77 and the abradable shroud 76, denoted 110 and 112 respectively, are disposed approximately opposite the corresponding fore and aft edges of the blade tip (not shown. The abradable shroud 76 comprises a material which is worn away in the event that the tip of the fan blade contacts the shroud 76. This allows the axis of the fan blades to temporarily deflect from the engine longitudinal centerline 12 without permanently damaging the blades or the casing 80.

The casing 80 may be constructed from a variety of materials including for example steel or aluminum. The casing 80 or sections of the casing 80 may be centrifugally cast, forged, or extruded. The casing made be fabricated from one or more circumferential or axial sections which are then joined together, for example by welding. The casing 80 may be formed as a pair of extrusions which are then welded together axially end-to-end to form the complete casing 80. The final dimensions and features of the casing 80 are then formed by machining or by other known methods.

The thickness of the impact resistant section 78 is smoothly contoured to optimize material usage and minimize overall weight. The casing of the present invention is able to sustain large radial deflections and thus absorb large amounts of energy without creating local high strain concentrations or shear failures due to abrupt material thickness changes. The impact resistant section 78 may further incorporate one or more areas of reinforcement 74 having a relatively increased thickness. These areas 74 allow for localized strengthening in empirically predicted primary impact areas. Unlike containment rings used in the prior art the areas 74 are smoothly blended into the adjacent sections of the casing 80. The casing may also incorporate one or more stiffening rings 72, which are described more fully in a later section, to meet vibration requirements.

Release of a blade under operating conditions is a complex event which is usually caused by the ingestion of a foreign object into the fan. The blade may experience a partial breakup before impacting the casing and may be shifted axially out of the plane of the fan disk by the impact of an adjacent blade.

The event of a blade release, the subsequent impact with the casing, and the resultant deflection of the casing is simulated by analytical methods known to those skilled in the art. One method involves using software modeling packages. An example of a commercially available software package is LS-Dyna, available from Livermore Software Technology Corporation, 2876 Waverly Way, Livermore, Calif. 94550, which uses an explicit method to produce a time forward solution of the nonlinear contact dynamics which occur when the blade impacts the casing 80. The software package produces a graphical plot of the strains that occur at each location within the casing 80 during a blade impact.

The results from the modeling software are used by a design engineer to modify the thickness of the casing 80 at various locations along the length of the impact resistant section. The new design is then subjected to the same simulation and a new set of results produced. The casing design proceeds through this iterative process until a satisfactory result is obtained.

When a blade impact occurs the impact resistant section 78 of the casing 80 is displaced radially outward and the material of the impact resistant section 78 of the casing 80 is subjected to plastic strain. The strain in the casing 80 at each axial location is dependent upon the specific material used in the casing 80, the impact dynamics, and the casing design. Because of regulatory and safety requirements the casing 80 must withstand piercing by the impact of a blade under prescribed test conditions. Also, the casing 80 must be as light as possible, as excess weight in an aircraft application degrades performance and increases fuel consumption. Using the iterative process previously described the thickness of the casing 80 is selected at each axial location along the length of the impact resistant section 78 such that the plastic strain level changes gradually along the length of the impact resistant section 78, peaking at a maximum level at the location of direct impact and gradually decreasing axially fore and aft away from the location of direct impact, without abrupt transitions in the level of plastic strain. Material is added to locations exceeding the allowable level of strain and removed from locations exhibiting very low strains. Ideally, given sufficient modeling capacity and increased iterations, the casing thickness could be optimized so that each location within the impact resistant section had the desired minimum margin between failure strain and the actual strain for a given impact condition, and no location had an excess over the required strain margin, i.e. the margin could be substantially uniform along the axial length of the impact resistant section 78.

As a practical example of the present invention, a design for a containment casing was created for an engine which has wide-chord titanium fan blades of approximately 93.8 inches diameter. The casing was to be made of an aluminum alloy, with an average casing thickness of about 1 inch.

The casing was modeled using a computer modeling package as previously described. A three-dimensional mesh was used to define the model. In the radial direction the mesh had three elements spanning the thickness of the casing. In the axial and circumferential directions the mesh size was approximately 3 to 5 times the radial dimension. This resulted in a mesh comprising a plurality of plate-like elements. When a blade release and impact was simulated this resulted in a maximum strain of about 8% and a minimum strain of about 5% within the impact-resistant section. It should be noted that the particular alloy under consideration exhibits about 8% elongation at failure, thus the estimated peak strain would represent failure in the outer element of the mesh at the point of highest strain. This is considered acceptable provided that the middle and inner elements do not fail, i.e. the case would not have been pierced by the blade.

The casing 80 is also required to provide sufficient radial stiffness or damping to avoid harmonic resonant couplings between the fan rotor and fan stator during engine operation. This condition, often referred to as rotor/stator "interaction", can lead to destructive levels of vibration, and is addressed by stiffening the casing 80 so that the interaction modes are outside of the operating range of the engine with a pre-scribed minimum margin.

Figure 6:
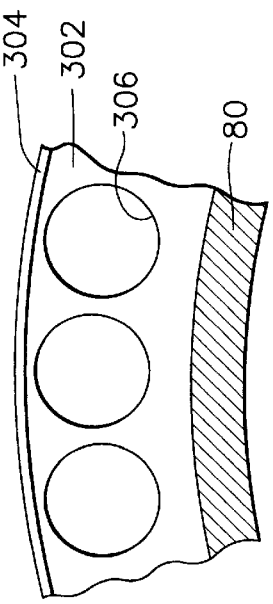
FIG. 6 is a schematic, fragmentary sectional view taken along lines 6—6 of FIG. 3.

The rotor/stator interaction requirements may be met by incorporating relatively tall, thin circumferential stiffening rings 302 extending radially outward from the radially outer surface of the casing 80, as shown in FIG. 6. The stiffening rings 302 incorporate a plurality of large diameter lightening holes 306 spaced at intervals around the circumference of the rings 302. The material thickness of the stiffening ring 302 and the number and diameter of holes 306 are selected such that the stiffening rings 302 provide the required frequency margin, yet collapse with little resistance when a blade released from the disk impacts the casing 80. These stiffening rings 302 therefore do not create local hard spots in the casing 80 which could compromise the intent of the smoothly contoured containment structure.

The stiffening rings 302 may be formed as part of the same extrusion or extrusions that form the casing 80, or may be separately fabricated and attached to the casing 80, for example by welding. The final dimensions of the stiffening rings 302, which may include circumferential outer flanges 304, and lightening holes 306 are formed by machining the partially finished extrusion or by other known methods.

Figure 4:
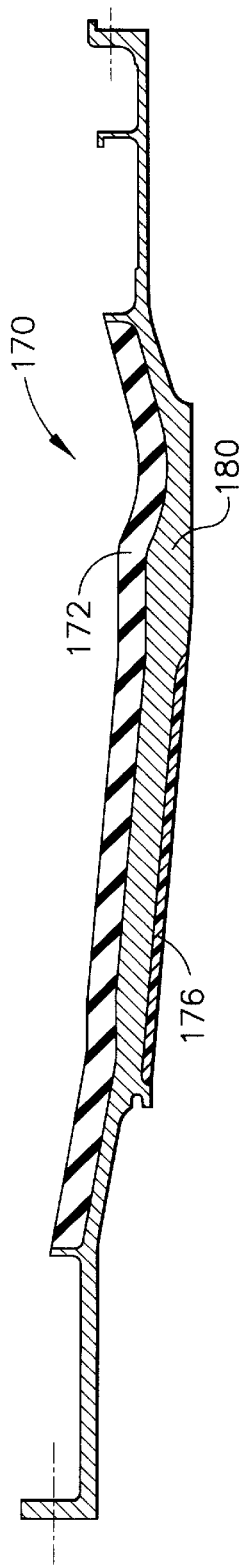
FIG. 4 is a schematic, enlarged fragmentary longitudinal cross-sectional view illustrating a second embodiment of the present invention.

According to another embodiment of the invention a containment structure 170 incorporates a damping material 172 disposed on the outer surface of the casing 180 to avoid vibrations. Referring to FIG. 4, The damping material 172 may take the form of a honeycomb cellular structure formed from sheet material, for example aluminum sheet. The damping material 172 may be fixedly secured to the casing 180, for example by adhesive bonding. The damping material 172 could also be formed from wraps of a woven ballistic fabric comprising synthetic fibers such as KEVLAR® fibers (KEVLAR® is a registered trademark of E. I. Du Pont De Nemours and Company), or any other suitable vibration damping material known to those skilled in the art.

Figure 5:
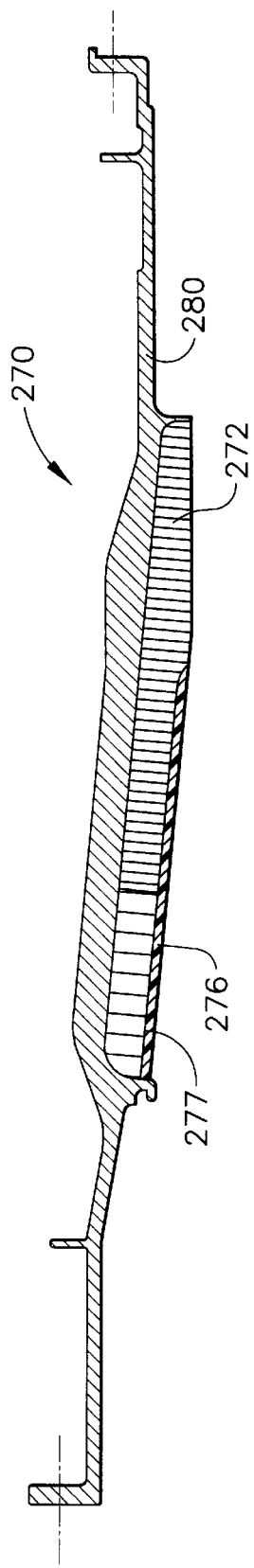
FIG. 5 is a schematic, enlarged fragmentary longitudinal cross-sectional view illustrating a third embodiment of the present invention.

In another embodiment of the containment structure, generally denoted 270 in FIG. 5, the casing 280 may be protected against vibrations by adding a suitable damping material 272 to the radially inner surface of the casing 280. The damping material 272 may take the form of a honeycomb cellular structure 272 formed from sheet material, for example aluminum sheet. The damping material 272 also incorporates a pocket 277 for an abradable shroud 276. This embodiment would be suitable for applications requiring an increased thickness of abradable material. One such application is an engine equipped with an apparatus known as a decoupler to disconnect the fan from the low pressure turbine system in the event of damage to the fan, for example a bladeout event caused by the ingestion of a foreign object. Decoupler-equipped engines allow greater radial deflection of the fan blades than engines without decouplers and thus require a greater thickness of abradable material 276 in the surrounding casing 280 to accommodate the gyrations of the blades without incurring permanent damage.

While specific embodiments of the present invention have been described, it will be apparent to those skilled in the art that various modifications thereto can be made without departing from the spirit and scope of the invention as defined in the appended claims.

We claim:

1. A blade containment structure for a turbomachine, comprising:
    a plurality of blades mounted to a generally circular disk rotatable about a centerline axis of said turbomachine;
    an annular casing, disposed in generally axial alignment with and generally concentrically surrounding said plurality of blades;
    said casing having at least one impact resistant section having a length measured parallel to said centerline axis of said turbomachine extending forward and aft of the respective edges of said blades and a predetermined thickness smoothly varying in the axial direction sufficient to resist penetration by a blade released from said disk, and
    at least one stiffening ring attached to and extending radially outwardly from a radially outer surface of said casing,
        wherein the properties of said stiffening ring are selected to allow said stiffening ring to buckle upon impact by a blade released from said disk.

2. The blade containment structure of claim 1, wherein said stiffening ring comprises a generally planar flange extending radially outwardly from said casing and integrally attached to said casing.

3. The blade containment structure of claim 2 wherein said stiffening ring contains a plurality of circumferentially spaced apart holes extending axially through said stiffening ring and between predetermined inner and outer radii of said flange.

4. A blade containment structure for a turbomachine, comprising:
    a plurality of blades mounted to a generally circular disk rotatable about a centerline axis of said turbomachine;
    an annular casing, disposed in generally axial alignment with and generally concentrically surrounding said plurality of blades;
    said casing having at least one impact resistant section having a length measured parallel to said centerline axis of said turbomachine extending forward and aft of the respective edges of said blades and a predetermined thickness smoothly varying in the axial direction sufficient to resist penetration by a blade released from said disk; and
    a damping structure disposed immediately adjacent to said casing and extending axially along said casing coextensive with said impact resistant section.

5. The blade containment structure of claim 4 wherein said damping structure is disposed on the outer surface of said casing.

6. The blade containment structure of claim 5 wherein said damping structure comprises a honeycomb cellular structure.

7. The blade containment structure of claim 5 wherein said damping structure comprises at least one layer of a woven ballistic fabric.

8. The blade containment structure of claim 4 wherein said damping structure is disposed on the radially inner surface of said casing.

9. The blade containment structure of claim 8 wherein said damping structure comprises a honeycomb cellular structure.

10. A blade containment structure for a turbomachine, comprising:
a plurality of blades mounted to a generally circular disk rotatable about a centerline axis of said turbomachine;
an annular casing, disposed in generally axial alignment with and generally concentrically surrounding said plurality of blades;
said casing having at least one impact resistant section having a length measured parallel to said centerline axis of said turbomachine extending axially forward and aft of the respective edges of said blades and a predetermined thickness smoothly varying in the axial direction sufficient to resist penetration by a blade released from said disk,
said impact resistant section having at least one primary impact area, said primary impact area having a thickness greater than an average thickness of said impact resistant section,
wherein the thickness of said impact resistant section varies smoothly between the thickness of said primary impact area and said average thickness, and at least one stiffening ring attached to and extending radially outwardly from a radially outer surface of said casing,
wherein the properties of said stiffening ring are selected to allow said stiffening ring to buckle upon impact by a blade released from said disk.

11. The blade containment structure of claim 10, wherein said stiffening ring comprises a generally planar flange extending radially outwardly from said casing and integrally attached to said casing.

12. The blade containment structure of claim 11 wherein said stiffening ring contains a plurality of circumferentially spaced apart holes extending axially through said stiffening ring and between predetermined inner and outer radii of said flange.

13. A blade containment structure for a turbomachine, comprising:
a plurality of blades mounted to a generally circular disk rotatable about a centerline axis of said turbomachine;
an annular casing, disposed in generally axial alignment with and generally concentrically surrounding said plurality of blades;
said casing having at least one impact resistant section having a length measured parallel to said centerline axis of said turbomachine extending axially forward and aft of the respective edges of said blades and a predetermined thickness smoothly varying in the axial direction sufficient to resist penetration by a blade released from said disk,
said impact resistant section having at least one primary impact area,
said primary impact area having a thickness greater than an average thickness of said impact resistant section,
wherein the thickness of said impact resistant section varies smoothly between the thickness of said primary impact area and said average thickness; and
a damping structure disposed immediately adjacent to said casing and extending axially along said casing coextensive with said impact resistant section.

14. The blade containment structure of claim 13 wherein said damping structure is disposed on the outer surface of said casing.

15. The blade containment structure of claim 14 wherein said damping structure comprises a honeycomb cellular structure.

16. The blade containment structure of claim 14 wherein said damping structure comprises at least one layer of a woven ballistic fabric.

17. The blade containment structure of claim 13 wherein said damping structure is disposed on the radially inner surface of said casing.

18. The blade containment structure of claim 17 wherein said damping structure comprises a honeycomb cellular structure.

19. A blade containment structure for a turbomachine, comprising:
a plurality of blades mounted to a generally circular disk rotatable about a centerline axis of said turbomachine;
an annular casing, disposed in generally axial alignment with and generally concentrically surrounding said plurality of blades;
said casing having at least one impact resistant section having a length measured parallel to said centerline axis of said turbomachine extending axially forward and aft of the respective edges of said blades and a predetermined thickness smoothly varying in the axial direction sufficient to resist penetration by a blade released from said disk,
wherein the thickness of said casing at each axial location is selected such that the casing exhibits a smoothly varying maximum plastic strain level within the length of said impact resistant section during a predicted impact of said blade, and at least one stiffening ring attached to and extending radially outwardly from a radially outer surface of said casing,
wherein the properties of said stiffening ring are selected to allow said stiffening ring to buckle upon impact by a blade released from said disk.

20. The blade containment structure of claim 19, wherein said stiffening ring comprises a generally planar flange extending radially outwardly from said casing and integrally attached to said casing.

21. The blade containment structure of claim 20 wherein said stiffening ring contains a plurality of circumferentially spaced apart holes extending axially through said stiffening ring and between predetermined inner and outer radii of said flange.

22. A blade containment structure for a turbomachine, comprising:
a plurality of blades mounted to a generally circular disk rotatable about a centerline axis of said turbomachine;
an annular casing, disposed in generally axial alignment with and generally concentrically surrounding said plurality of blades;
said casing having at least one impact resistant section having a length measured parallel to said centerline axis of said turbomachine extending axially forward and aft of the respective edges of said blades and a predetermined thickness smoothly varying in the axial direction sufficient to resist penetration by a blade released from said disk, wherein the thickness of said casing at each axial location is selected such that the casing exhibits a smoothly varying maximum plastic strain level within the length of said impact resistant section during a predicted impact of said blade; and a damping structure disposed immediately adjacent to said casing and extending axially along said casing coextensive with said impact resistant section.

23. The blade containment structure of claim 20 wherein said damping structure is disposed on the outer surface of said casing.

24. The blade containment structure of claim 23 wherein said damping structure comprises a honeycomb cellular structure.

25. The blade containment structure of claim 23 wherein said damping structure comprises at least one layer of a woven ballistic fabric.

26. The blade containment structure of claim 22 wherein said damping structure is disposed on the radially inner surface of said casing.

27. The blade containment structure of claim 26 wherein said damping structure comprises a honeycomb cellular structure.

* * * * *